(12) United States Patent
Cuvelier (10) Patent No.: US 8,247,735 B2
(45) Date of Patent: Aug. 21, 2012

(54) INSTALLATION FOR PERFORMING OPERATIONS OF SHAPING GLASS OR CRYSTAL PIECES

(75) Inventor: Georges Cuvelier, Houdeng-Goegnies (BE)

(73) Assignee: Georges Cuvelier, Houdeng-Goegnies (BE)

( * ) Notice: Subject to any disclaimer, the term of this patent is extended or adjusted under 35 U.S.C. 154(b) by 1159 days.

(21) Appl. No.: 11/995,959

(22) PCT Filed: Jul. 18, 2006

(86) PCT No.: PCT/EP2006/064360
§ 371 (c)(1),
(2), (4) Date: Jan. 17, 2008

(87) PCT Pub. No.: WO2007/009985
PCT Pub. Date: Jan. 25, 2007

(65) Prior Publication Data
US 2010/0116798 A1    May 13, 2010

(30) Foreign Application Priority Data
Jul. 18, 2005  (BE) .................................. 2005/0361

(51) Int. Cl.
*B23K 26/00* (2006.01)
*C03B 9/00* (2006.01)
(52) U.S. Cl. ..................................... 219/121.68; 65/227
(58) Field of Classification Search ............. 219/121.67–121.69; 65/65, 77–79, 65/227, 229, 230, 231, 246–248, 252
See application file for complete search history.

(56) References Cited

U.S. PATENT DOCUMENTS

| 1,904,959 | A | | 4/1930 | Soubier | |
|---|---|---|---|---|---|
| 3,841,859 | A | * | 10/1974 | Becker et al. | 65/207 |
| 3,951,636 | A | * | 4/1976 | Gunthner | 65/207 |
| 4,682,003 | A | | 7/1987 | Minakawa et al. | |
| 6,438,996 | B1 | | 8/2002 | Cuvelier | |
| 7,002,101 | B2 | * | 2/2006 | Cuvelier | 219/121.72 |
| 2004/0016729 | A1 | | 1/2004 | Cuvelier | |

FOREIGN PATENT DOCUMENTS

FR            1 080 544 A    12/1954
* cited by examiner

*Primary Examiner* — Sang Paik
(74) *Attorney, Agent, or Firm* — Sughrue Mion, PLLC (57) ABSTRACT

The invention relates to an installation that is used to perform operations for forming glass or crystal pieces (21), comprising: at least one drive wheel and at least one idler wheel (3); a support element which is driven by the drive wheel; main mandrels (7) which are supported by the support element and which, in turn, each support a first end of a glass or crystal piece (21); and work stations. According to the invention, at least one wheel takes the form of a carousel (2) which comprises secondary mandrels (8), numbering fewer than the main mandrels (7), and which co-operates with the moving support element. Each secondary mandrel (8) opposes a main mandrel (7) along a common axis (23) and supports the second end of the glass or crystal piece.

7 Claims, 10 Drawing Sheets

INSTALLATION FOR PERFORMING OPERATIONS OF SHAPING GLASS OR CRYSTAL PIECES

The present invention relates to an installation for performing operations of shaping glass or crystal pieces, comprising
at least one drive wheel and at least one return wheel,
a support element driven in circulation by the said at least one drive wheel so as to pass around the said at least one return wheel and the said at least one drive wheel,
main chucks in a predetermined number that are supported by the support element and that, in the active position, each hold a glass or crystal piece by a first end thereof, and
work stations situated along the support element in circulation, which perform the shaping operations on the said glass or crystal pieces.

The object of the present invention is an installation for performing more particularly cutting operations on glass or crystal pieces, specifically table or decoration articles.

The glass or crystal articles are produced, with regard to the hollow part, which is hereinafter referred to as "the parison" and is intended to receive the content, by a hot plastic deformation of molten material, by pressing or blowing operations or any other similar operation giving rise to a hot plastic deformation.

To this hollow part there is sometimes added an element such as a foot, itself formed separately, also from molten materials, and fixed to the hollow part by a welding operation by putting in contact and remelting.

The result of these operations is generally a semi-finished article consisting of the article proper, hereinafter referred to as "the article", to which there is still attached, by the open end of the hollow part, a mass of glass or crystal, hereinafter referred to as "the cap", which was used to hold the article during the phase of forming by hot plastic deformation.

The purpose of the following operations is generally to separate the article proper from the cap and to give to the edge thus generated mechanical properties of shape, roughness and strength compatible with and desirable for the use for which the article is intended.

The operation of decapping the article proper is conventionally carried out by various methods that make use of various cutting appliances, such as burners, diamond-charged elements, carbide wheels or laser beams.

These various methods sometimes require for their implementation a holding of the article at the two ends, that is to say by its foot or its parison and by the cap.

The methods requiring the use of two holding chucks are conventionally implemented on round machines, comprising a fixed base, on which there is mounted a carousel that can be set in rotation with respect to the fixed base about a vertical axis, situated substantially at the centre of the machine (see for example the Belgian patent BE-A-903908). The carousel is divided angularly into a given number of sections, all identical, equipped with mechanical elements adapted to the gripping of the article to be processed; for the majority of the time it is a case of rotary chucks with three or four jaws, intended to hold the article at the most suitable point and to set it in rotation. The articles are generally automatically loaded onto each section as the carousel rotates so that, in normal functioning, all the sections following the loading and preceding the unloading carry an article that is successively to undergo all the operations necessary for its conversion between the loading point and the unloading point. The unloading is usually automatic.

The operations necessary for the conversion of the article are performed by mechanical equipment, thermal equipment, for example burners or the like, or elements relating to laser technology, constituting the successive work stations located so that, when the operations of conversion of the article take place, each work station is positioned with respect to a section so as to be able to perform the operation for which it was designed on the article held in this section.

In the case where the work stations are connected to the fixed base of the machine, the rotation of the carousel is generally sequential: the rotation is performed during a non-productive indexing phase that is in general performed as quickly as possible; during this indexing phase, the angle of rotation is such that the advance of the chain corresponds either to the distance between the axes of two consecutive chucks, and it is then said that the machine is of the single-indexing type, or to twice the distance between the axes of two successive chucks, and it is then said that the machine is of the double-indexing type, or at three times the distance between the axes of two consecutive chucks, and it is then said that the machine is of the triple-indexing type. Single indexing is generally used on small lower-production machines. Double and triple indexing are often used since they usually correspond to optimum economics; in these cases, the sections comprise twice or three times the gripping equipment for the articles and the work stations comprise twice or three times the equipment for performing the operations. Quadruple indexing or of even higher rank is rarely envisaged because of the size of the machines to be used. The operations are performed when the carousel is immobilised so that each fixed work station can perform the operation for which it was designed on one or more articles held in a section.

In the case where the work stations are connected to the carousel, each section of the carousel merges with a work station; the number of work stations is therefore equal to the number of sections, all the work stations are identical and successively perform, during the rotation of the machine, all the operations necessary for the conversion of the article; in this case, the rotation of the carousel is generally continuous.

The round machines described above have several drawbacks:
given a defined spacing between two sections, the number of sections determines the diameter of the machine. The number of sections is defined by the number, the complexity and the time necessary for performing the operations; the greater the number, complexity and time necessary for the performance of the operations, the greater the number of sections.

An excessively large machine diameter makes the machine too bulky, too heavy, too complex to produce and therefore too expensive. In addition, in the case of machines with rotation by indexing, the inertia of the machine becomes such that the power to be used for performing this indexing in a sufficiently short time becomes very high, which has a tendency to increase further the complexity and manufacturing cost.

in the case where the machines use methods that require the use of two opposing chucks intended to hold the article by the two ends, consisting of the article proper and the cap, it happens that one of the two chucks is used only for a small proportion of the time necessary for the complete implementation of the process of converting the article on a section.

As a result, since on a round machine all the sections must be identical, on each section the chuck concerned is used proportionally only for the proportion of time where it is necessary to the complete process; during the rest of the time, it is inactive.

in the case of a decapping process requiring the use of two opposing chucks, intended to hold the article by the two ends, the discharge of the cap must be effected by a related installation, a manipulator or a robot, which must support and remove the cap away from the centre of the machine, until this cap has left the work area where the chucks are situated.

Installations are also known such as the one indicated at the start (see for example EP-B-0988255 and EP-B-1335884). These installations are machines with an articulated transfer chain. This transfer chain carries the chucks intended to hold the articles; it meshes in a motorised drive wheel and a return wheel; between these two wheels, the chain is substantially tensioned in two rectilinear lengths guided in a suitable manner. The chucks are brought successively in front of the various work stations by indexing, that is to say intermittent rotation, caused by the drive wheel, making the chain advance by the equivalent of once, twice or even three times, but rarely four times or more, the distance between two successive chucks. Compared with round machines, these machines are lighter, they take up less space on the floor and are more modular. They have the drawback of allowing solely the implementation of methods in which the article is held by a single chuck and in which the cap is left free, without ever itself being held by a second chuck.

The aim of the present invention is to remedy the drawbacks cited above and to develop an installation that keeps the advantages of the articulated—chain machines.

This problem has been resolved by an installation, as indicated at the start, in which at least one wheel among the said at least one drive wheel and the said at least one return wheel is a carousel that comprises secondary chucks fewer in number than the predetermined number of main chucks and that cooperates, in a cooperation zone, with the support element in movement, and, in this cooperation zone, each secondary chuck is arranged in opposition to a main chuck on a common axis and holds a glass or crystal piece by a second end thereof, opposite to the first.

The installation according to the invention preferably comprises a fixed base at one end of which the carousel is mounted comprising a small number of sections. On each section of this carousel there are fixed the chucks that are only partially used during the complete performance of the operations, that is to say the "secondary chucks". The chucks used throughout the time of performance of the operations, referred to as the "main chucks", are mounted on the said support which, in moving, cooperates with the carousel as the latter rotates, so that two chucks, a main one and a secondary one, are opposite and aligned on the same substantially vertical axis, with sufficient precision, depending on the tolerances of the construction, and thus constitute, in the angle of rotation of the carousel where the support carrying the main chucks cooperates with the carousel, complete sections comprising both a main chuck and a secondary chuck, sufficient in number to be able to perform on these completed sections all the operations requiring the use of two chucks.

After its cooperation with the carousel, the support moves away from the carousel, guided in suitable mechanical elements, towards a return wheel, with a much more simple construction than the carousel carrying the secondary chucks, by means of which it is returned towards the carousel.

Along the path traveled outside the carousel by the support, that is to say from the exit from the carousel as far as the return wheel, along the travel where it cooperates with the return wheel and on the return path between the exit from the return wheel as far as the carousel, there are located the work stations not requiring the use of the secondary chucks, as well as the loading and unloading stations.

Such an installation allows the use of a carousel of small diameter, and therefore compact and inexpensive, while keeping the advantages of the articulated—chain machines, in particular their simple modular design.

According to one embodiment of the invention, the main chucks are mounted on the support element and the secondary chucks on each carousel so as to allow, in the said cooperation zone, a relative movement between the opposite chucks along their common axis, between a distant position and a close position and vice versa. Advantageously, the main chucks and the secondary chucks arranged in opposition are mounted so as to be able to be driven in rotation synchronously about their common axis. These arrangements allow a precise gripping of the pieces to be treated in the work stations requiring a holding of these by their two ends, and a rotation of the pieces held about a precise rotation axis.

According to an advantageous embodiment of the invention, the support element is an endless transporter train and each carousel comprises cooperation means in which the transporter chain meshes in the said cooperation zone. Other forms of support element can obviously be designed, capable of travelling between the drive wheel and the return wheel or wheels, such as for example a conveyor belt.

According to one embodiment of the invention the work stations comprise at least one cutting station enabling the glass or crystal piece to be decapped. These cutting stations can preferably comprise a laser-beam device, but it is also possible to provide stations for cutting by diamonds or carbide wheels or by means of burners.

Advantageously, the installation also comprises, upstream of the cutting station, at least one station pre-heating the pieces to be cut and, downstream of the cutting station, at least one cut-edge polishing station. The pre-heating means are any means appropriate for this purpose, known to persons skilled in the art, for example burners. The edge polishing means may for example be burners or laser-beam instruments or normal mechanical polishing means.

The installation may also comprise at least one quality control station and/or at least one station for marking or decorating the machined piece.

According to a preferred embodiment of the invention, the installation comprises a single carousel, formed by a drive wheel, and a single return wheel.

It is also obviously possible to make provision according to the invention for one or more return wheels to be arranged also in the form of a supplementary carousel supporting additional secondary chucks in a manner identical or similar to the arrangement of the carousel forming the drive wheel.

Other details and particularities of the invention will emerge from the description given below, non-limitatively and with reference to the accompanying drawings.

In the various drawings, identical or similar elements bear the same references.

Figure 1:
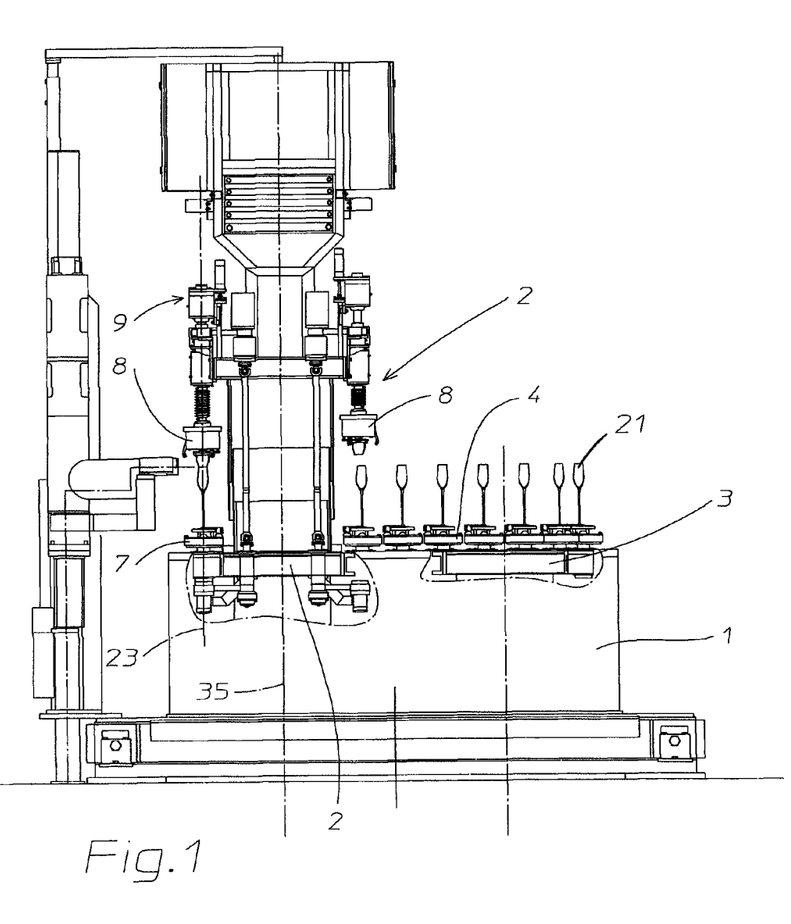
FIGS. 1 and 2 depict a view in side elevation and a plan view of an installation according to the invention.
Figure 2:
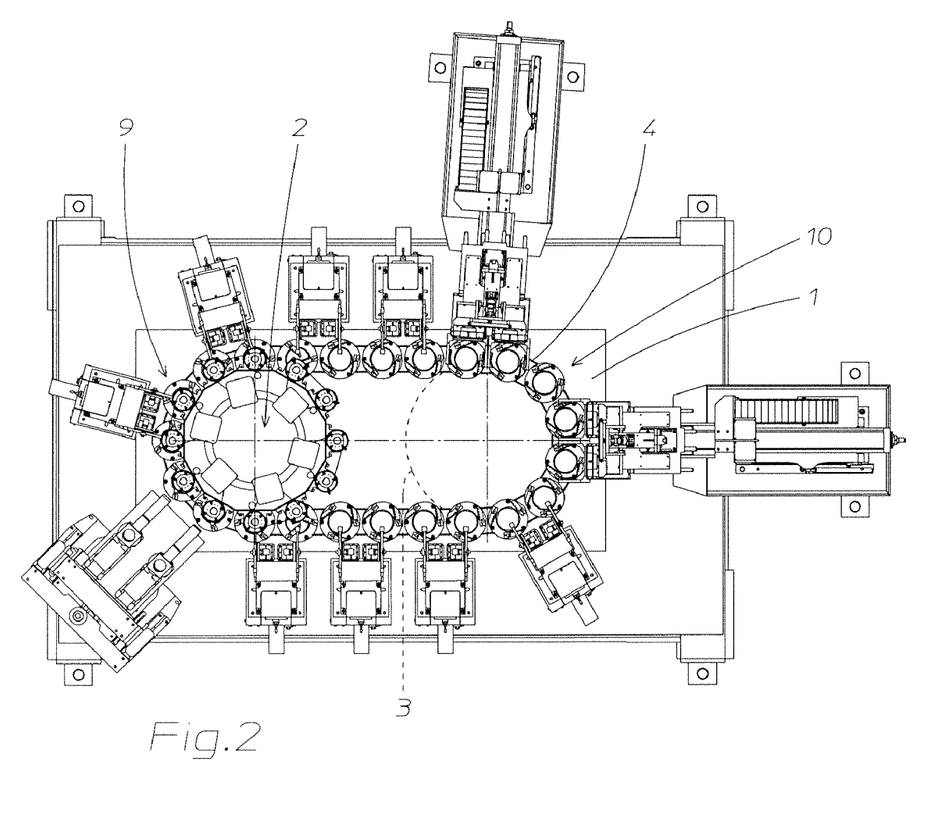

The installation shown in FIGS. 1 and 2 comprises a base 1, on which there are mounted a drive wheel in the form of a carousel 2 and a return wheel 3 shown schematically.

The carousel 2 comprises twelve heads 9. The rotation of the carousel 2 is effected about the axis 35 by double indexing, that is to say the equipment in the sections and work stations are double and, at each indexing, a head 9 that was situated, before the indexing, at position i is situated, after indexing, at position i+2. In this case, the rotation angle at each indexing is 360° divided by 6, that is to say 60°, and the twelve-head carousel 2 is in reality composed of six double sections. The positions where the heads 9 are immobilised for performing the operations are marked from A to L in FIG. 8.

In the example illustrated a support element in the form of an endless articulated chain 4 is driven by the carousel 2 and travels around it and the return wheel 2. The chain 4 comprises twenty-three links 5, and twenty-three main chucks 7 are mounted on this chain concentrically with the articulation axes 6 of the links. The main chucks 7 are mounted here in the bottom part of the installation and their gripping face is oriented upwards. The positions where the articulation axes 6 of the links 5 of the chain 4 are immobilised for performing operations are numbered from T01 to T23 in FIG. 8.

Each head 9 of the carousel 2 carries a secondary chuck 8. These secondary chucks are therefore twelve in number. They are mounted in this example in the top part of the installation and their gripping face is oriented downwards. They are mounted on a moving support able to move along an axis parallel to the axis of the chuck. The movement of the secondary chuck parallel to its axis is made necessary because of the treatment of articles of different heights and also because, during certain operations, a movement of the secondary chuck 8 is required with respect to a main chuck 7 facing it. The main chuck 7 and the secondary chuck 8 gripping the two ends of the article 21 are arranged coaxially along the axis 23.

The return wheel 3 also has twelve heads 10; the result is that the two lengths of the chain 4 connecting the carousel 2 to the return wheel 3 are parallel and the contact angles of the chain 4 with the carousel 2 and return wheel 3 are 180°.

On immobilisation, the chain 4 is meshed in the carousel 2 in a cooperation zone between and including positions A to G of the carousel 2 or T07 to T13 of the chain 4, that is to say seven heads 9 are meshed. It is therefore possible to perform, on three double work stations, that is to say on six of the seven heads 9 where the chain 4 is meshed in the carousel 2, three operations requiring the use of the secondary chucks 8.

On immobilisation, the chain 4 is also meshed in six heads 10 of the return wheel 3 and each of the rectilinear lengths of the chain 4 has five positions. On these sixteen positions, it is possible to install at a maximum eight double work stations on which it is possible to perform operations not requiring the use of the secondary chucks 8.

Figure 8:
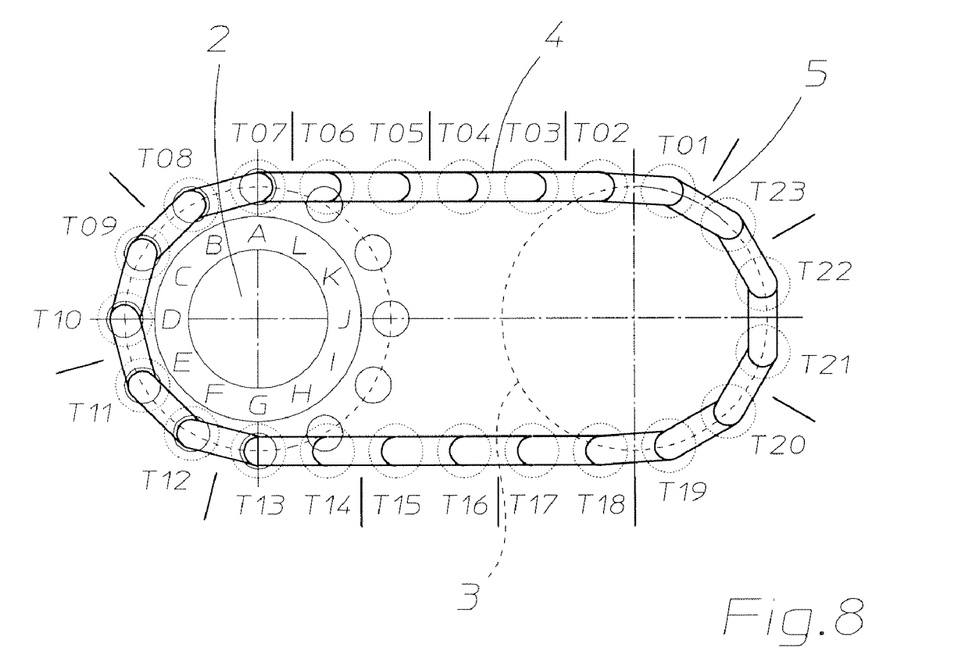
FIGS. 8 to 10 depict schematically three variant embodiments of an installation according to the invention.

In the particular case in FIGS. 1 and 2 as well as 8, the installation performs a decapping of the articles. The sequence of the operations is as follows:

The loading station is situated at positions T01 and T02, that is to say partially at the exit from the return wheel 3 and on the rectilinear length of the chain 4 that returns towards the carousel 2. On this station, two articles are each gripped by a main chuck 7, by the foot or bottom, the parison open upwards, the cap 21a constituting the top part of the article 21.

At positions T03 and T04 there is located a first double work station preheated by means of suitable burners.

At positions T05 and T06 there is located a second double work station preheated by means of suitable burners.

At positions T07 and T08 there is located a third double work station preheated by means of suitable burners. These positions corresponding to positions A and B of the carousel 2, secondary chucks are available there. The working time is used at this station to grip the two articles 21 at their cap 21a by the two secondary chucks 8, the jaws of which are clamped around the cap. This is effected by bringing in the chuck 8 from its distant position, illustrated to the right of the carousel 2 in FIG. 1, as far as its close position, illustrated to the left of the carousel in this figure.

At positions T09 and T10 there is located a fourth double work station preheated by means of suitable burners. At this station, the last preheating step is carried out until a ring of material of the article 21 situated on each side of the theoretical cutting plane 22 becomes viscous; at this stage, there is exerted on the secondary chuck that has gripped the article by the cap a force that has a tendency to move it away by a controlled distance from the main chuck: the viscous ring is thus stretched in the direction of its small height and therefore has a tendency to thin.

At positions T11 and T12 there is located the double work station for cutting proper by means of two beams generated separately by two lasers as illustrated or by a single laser, the beam in this case being split also into two by suitable optical elements. At this station, there is continued to be exerted on the secondary chuck 8 that has gripped the article by the cap 21a a force that has a tendency to move it away by a controlled distance from the main chuck 7; the separation of the cap 21a from the article 21 takes place as soon as the action exerted by the laser beam has sufficiently reduced the mechanical strength of the material at the theoretical cutting plane 22, that is to say, in this case, at a point on the ring of material already thinned by the previous operation.

At positions T13 and T14 there is located a first double work station for treating the edge of the article 21 generated by the operation of cutting by a laser beam. In this illustrated case, it is a question of a first heating by suitable burners that is to lead to what is commonly referred to as flame polishing.

At positions T15 and T16 there is located a second double work station allowing a second heating by suitable burners that is to result in a flame polishing.

At positions T17 and T18 there is located a third double work station affording a third heating by suitable burners that is to result in a flame polishing.

At positions T19 and T20 there is located a double work station for cooling the article 21, especially close to the edge generated by the previous operation. In this illustrated case, it is a question of cooling at a lower temperature, generally room temperature.

The unloading station is situated at positions T21 and T22. At this station, the two articles are released from the main chucks, while being gripped either mechanically or by the vacuum produced inside the parison, and transferred onto a subsequent treatment installation.

Position 23 remains free.

Position T13 is the last one, in the direction of travel of the chain 4, where the chain 4 is meshed in the carousel 2; at position T14, the secondary chuck 8 connected to the carousel 2 has begun to move away from the main chuck 7 connected to the chain 4 and with it the cap 21a that it continues to hold. After the following indexing, the two secondary chucks carrying the caps 21a are, on the carousel 2, at positions I and J of the carousel 2. At this point, the lower part of the installation is free and it suffices to open the jaws of the secondary chucks 8 for the caps 21*a* to be discharged simply by falling into a hopper or any other normal collection installation, not shown.

Figure 3:
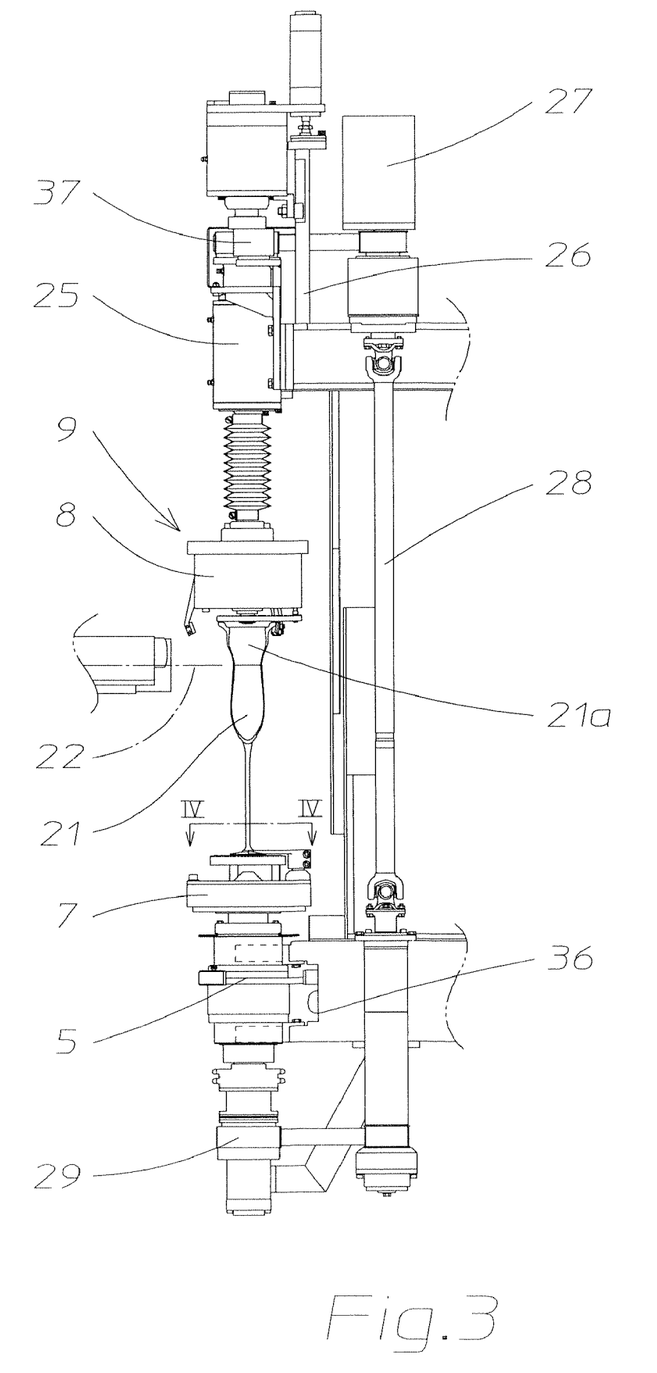
FIG. 3 depicts a profile view of a glass piece held by both ends by chucks, at the drive carousel.
Figure 4:
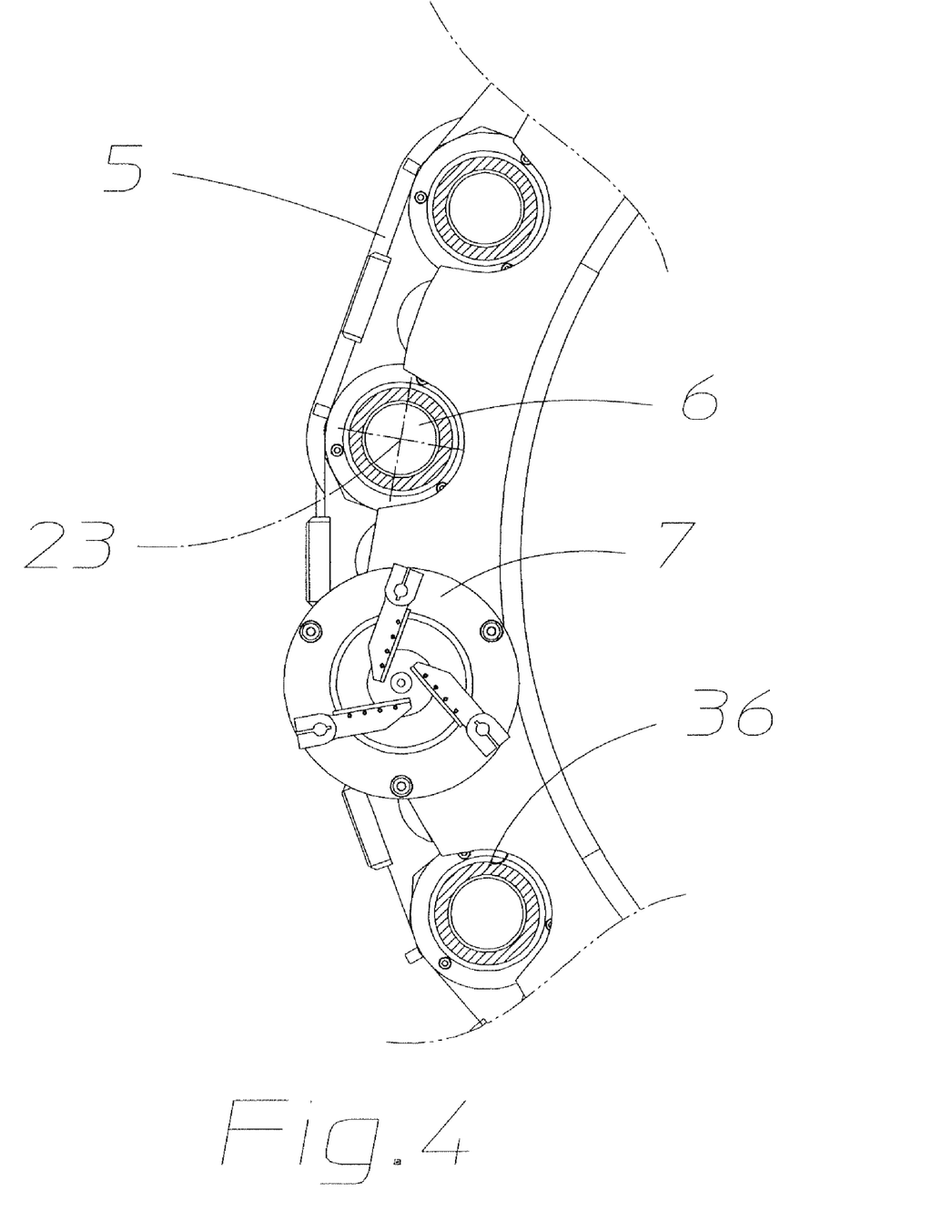
FIG. 4 depicts a view in section, along the line IV-IV in FIG. 3.

FIGS. 3 and 4 show two double sections like the ones mentioned during the description of a double-indexing installation, illustrated by FIG. 1. They are located at the points where the chain 4 meshes in the carousel 2, that is to say where each of the main chucks 7 fixed to the chain 4 faces a secondary chuck 8 fixed to the carousel 2. At each of these points an operation requiring the use of the secondary chucks 8 is performed.

The article 21, here consisting of a stemmed glass, is held at the base by a main chuck 7 and at the cap 21*a* by a secondary chuck 8. The main chucks 7 are fixed to the links 5 of the chain 4, the articulation axes 6 of which are meshed at this moment in housings 36 in each head 9 provided for this purpose in the carousel 2.

The main chucks 7 are mounted on the chain 4 concentrically with the articulation axis 6 of the links 5 by means of roller bearings that allow a free rotation of the chucks with respect to the links 5, about an axis 23.

The secondary chucks 8 are mounted on the carousel 2 by means of a bearing housing 25 also comprising roller bearings allowing a free rotation of these with respect to the carousel 2, about the aforementioned axis 23. The bearing housing 25 is itself fixed to the moving part of a linear guidance 26, the movement axis of which is substantially parallel to the rotation axis 23 common to the corresponding main chuck 7 and secondary chuck 8.

During the operations using the secondary chuck 8, the latter can be moved along the linear guidance 26 by normal control means under the effect either of a controlled force or under the effect of an imposed movement, so as to obtain, during the operation, the expected effect with regard to the conversion of the article.

During an operation using the secondary chuck 8, the main chuck 7 and the secondary chuck 8 are generally set in synchronous rotation by means of a motor 27 and a transmission 28 located on the carousel 2. The transmission 28 is, by means of a mechanism 37, permanently engaged on the secondary chuck 8, also located on the carousel 2. The transmission 28 is engaged on the main chuck 7, during the period when the chain 4 is meshed on the carousel 2, by means of a mechanism 29, disengageable just before the articulation axis 6 of the adjacent links 5 leaves the carousel 2.

Figure 5:
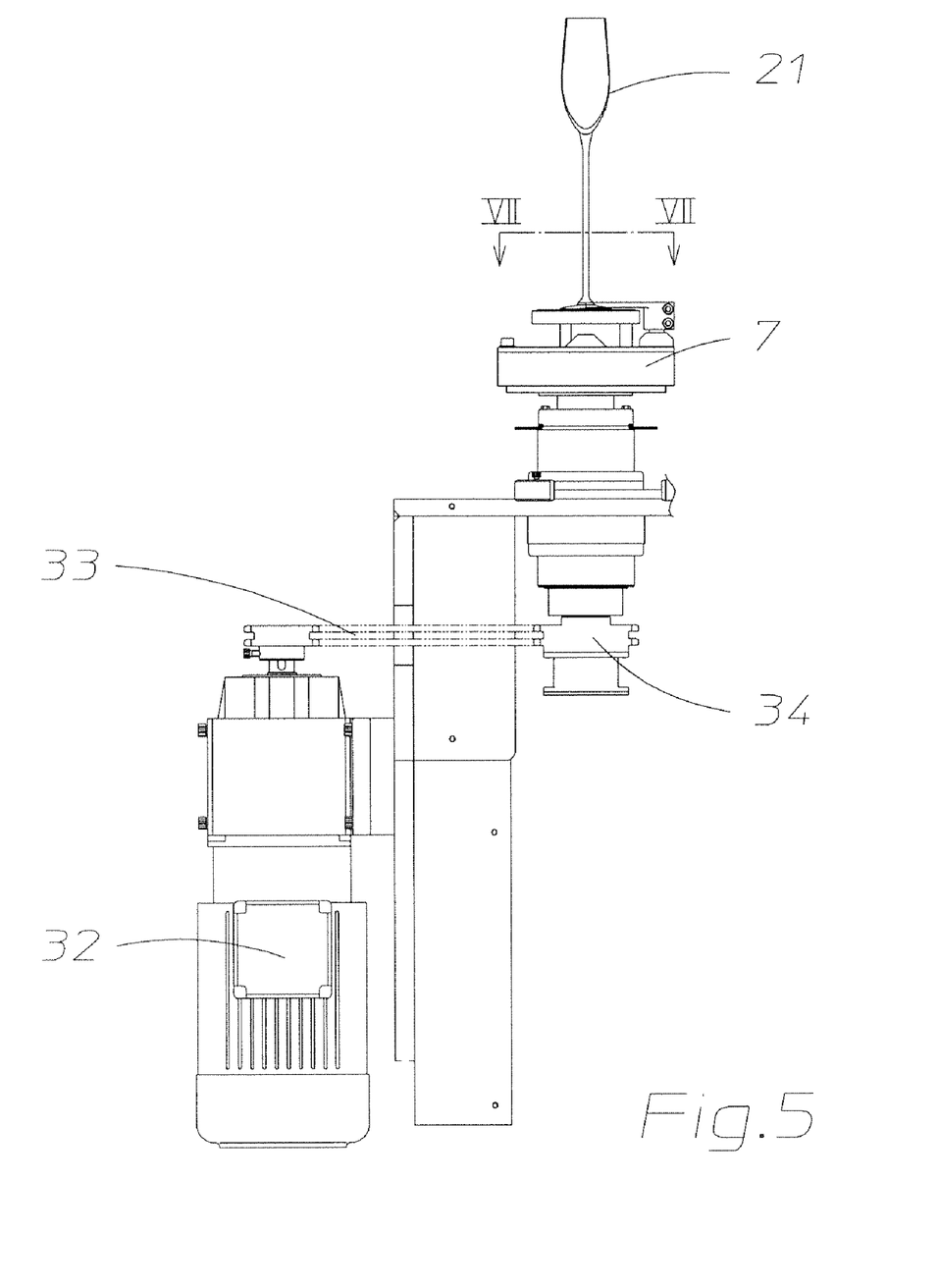
FIGS. 5 and 6 depict respectively profile and front views of a glass piece held by one end by a chuck, when the support chain does not cooperate with the carousel.
Figure 6:
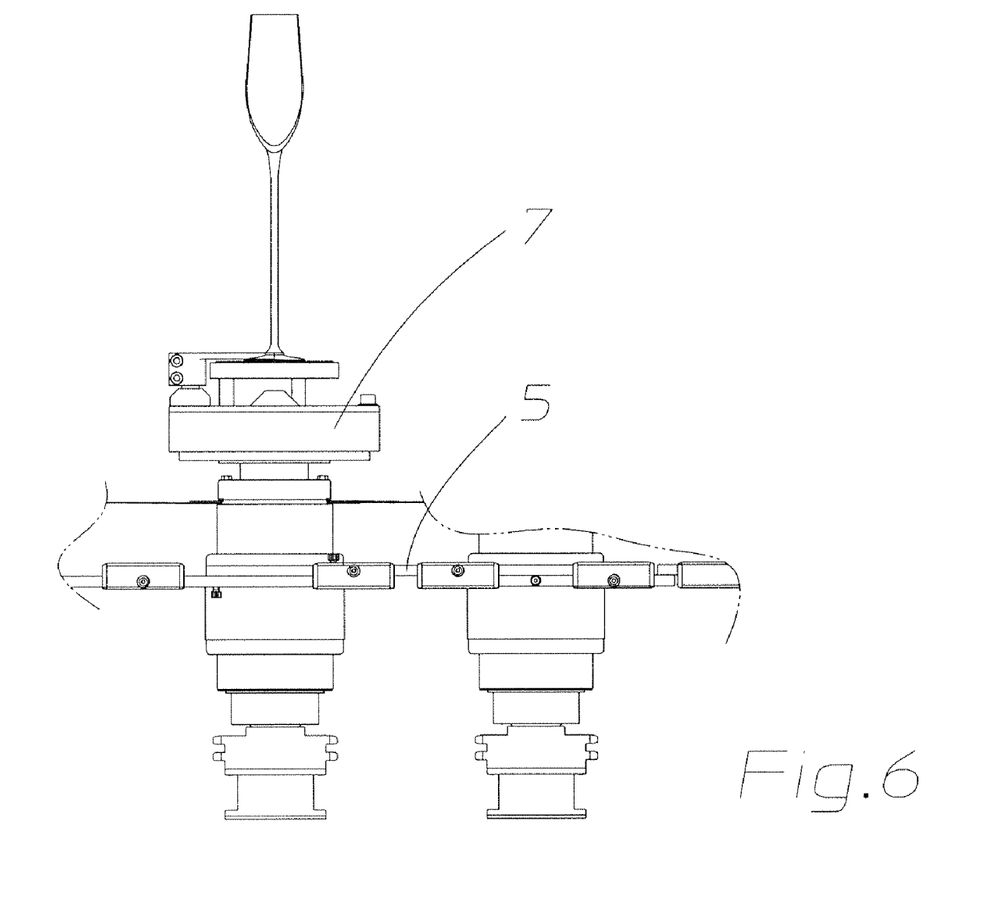
Figure 7:
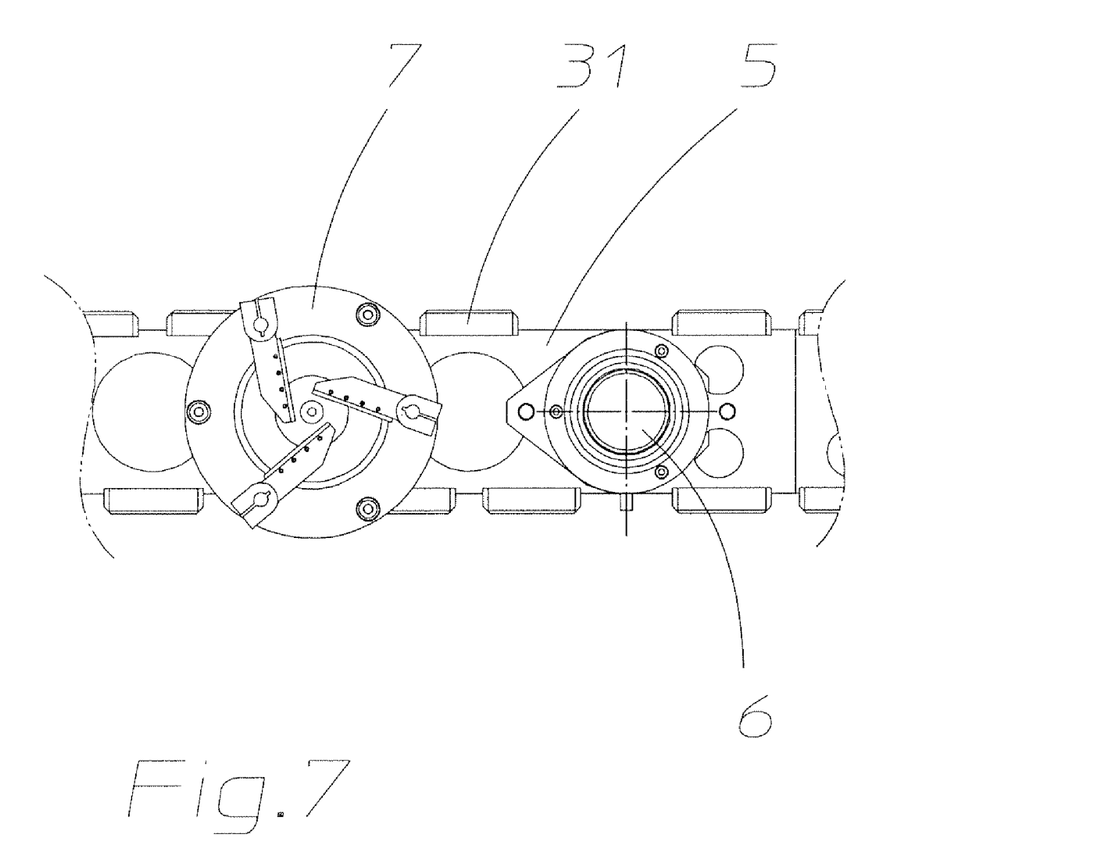
FIG. 7 depicts a section, along the line VII-VII in FIG. 5.

FIGS. 5 to 7 show a double section like the one mentioned during the description of a double-indexing installation, illustrated by FIG. 1. This section is located at one of the points where the chain 4 is situated between the carousel 2 and the return wheel 3. At this point, the chain is rectilinear and substantially tensioned. The links 5 are held by guides 31.

At the time when the chain 4 is stopped before a work station between the carousel 2 and the return wheel 3, an operation not requiring a secondary chuck 8 is performed. Only the main chuck 7 is involved. It is in general set in rotation about the axis 6 by means of a motor 32 and a transmission 33, both located on the work station concerned.

Once the chain is immobile, the transmission 33 is engaged on the main chuck 7 by means of a mechanism 34, disengageable at the end of the operation performed on this station, just before the following indexing.

Figure 9:
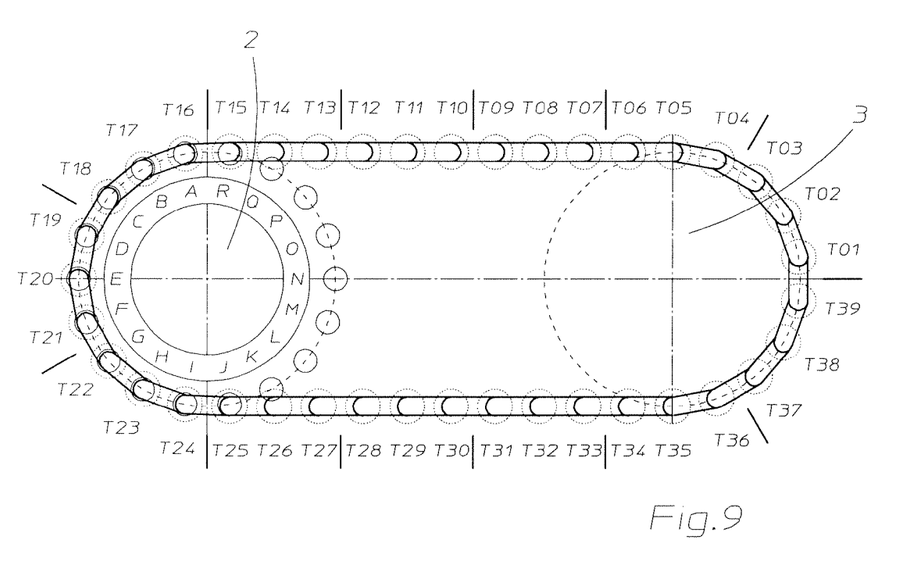

FIG. 9 shows another possible embodiment of the installation according to the invention.

This is an installation comprising a base 1 on which a carousel 2 with eighteen heads 9 is mounted, a vertical axis of each head of which constitutes the rotation axis 23 common to the mechanical elements adapted to the gripping of the articles; the positions where the heads 9 are immobilised for the performance of the operations are marked A to R. The rotation of the carousel 2 is effected by triple indexing, that is to say the equipment of the sections and work stations is tripled and, at each indexing, a head 9 that before the indexing was situated at position i is after indexing situated at position i+3. In this case, the rotation angle at each indexing is 360° divided by 6, that is to say 60° as in the previous case, and the eighteen-head carousel 2 is in reality composed of six triple sections.

The installation also comprises a chain 4 of thirty-nine links 5. The thirty-nine main chucks 7 are mounted on the chain 4 concentrically with the articulation axes 6 of the links 5. The main chucks 7 are mounted in the bottom installation part and their gripping face is oriented upwards. The positions where the articulation axes 6 of the links 5 of the chain 4 are immobilised for performing operations are numbered T01 to T39.

The installation also comprises a return wheel 3, also with eighteen heads 10; the result is that the two lengths of the chain 4 connecting the carousel 2 to the return wheel 3 are parallel and the contact angles of the chain 4 with the carousel 2 and return wheel 3 are 180°.

On immobilisation, the chain 4 is meshed in the carousel 2 between and including positions A to I of the carousel 2 or T16 to T24 of the chain 4, that is to say nine heads 9 are meshed. It is therefore possible to perform, on three triple work stations, that is to say on the nine heads 9 where the chain 4 is meshed in the carousel 2, three operations requiring the use of secondary chucks 8.

On immobilisation, the chain 4 is meshed in ten heads 10 of the return wheel 3 and each of the rectilinear lengths of the chain 4 comprises ten positions. On these 30 positions, it is possible to locate at a maximum 10 triple work stations on which is it possible to perform operations not requiring the use of the secondary chucks 8.

The functioning of this installation is, apart from this, of the same type as the installation according to FIG. 8.

It must be understood that the present invention is in no way limited to the embodiments described above and that many modifications can be made thereto without departing from the scope of the accompanying claims.

An installation according to the invention with single indexing and an installation with quadruple indexing can for example be easily imagined.

It is also possible to imagine that installations such as those described previously may be adapted in order to be not installations with rotation by indexing but installations with continuous rotation. For this purpose it is necessary for all operations necessary for the conversion of the article 21 to be able to be carried out while the chain 4 is in continuous movement. This can easily be envisaged for work stations equipped with burners for pre-heating and flame polishing, and also for those equipped with air nozzles for cooling: it suffices for the burners and nozzles to be of the linear type, disposed substantially parallel to the movement of the articles 21 on the chain 4, both in the straight parts and the curved parts. With regard to the laser-cutting station, it is possible, in a known manner, to equip lasers with movable optical lasers, the movements of which are controlled by a supervision system that includes in its management mode the movement of the chain 4.

It is also possible to envisage providing the return wheels 3 with equipment for performing, at places where the chain 4 meshes with the return wheel 3, known operations such as compressed air tempering stations or machines on which the articles are partially annealed and the edges, previously generated by a crack-off operation, flame polished.

It is also perfectly possible to envisage performing on an installation as characterised by the invention various operations such as the welding of a leg on a foot, the welding of a leg and foot on a parison, the stretching of part of the article by hot plastic deformation, polishing, by any means whatsoever, of the "mould marks", this is to say undesirable traces left by hot moulding on the articles, the marking of the articles, the decoration of the articles, or inspection of the articles.

It is also possible to easily imagine more complex installation configurations, for example an installation composed of two carousels 2, the rotations of which are correlated mechanically or by a suitable control of the drive motors.

Figure 10:
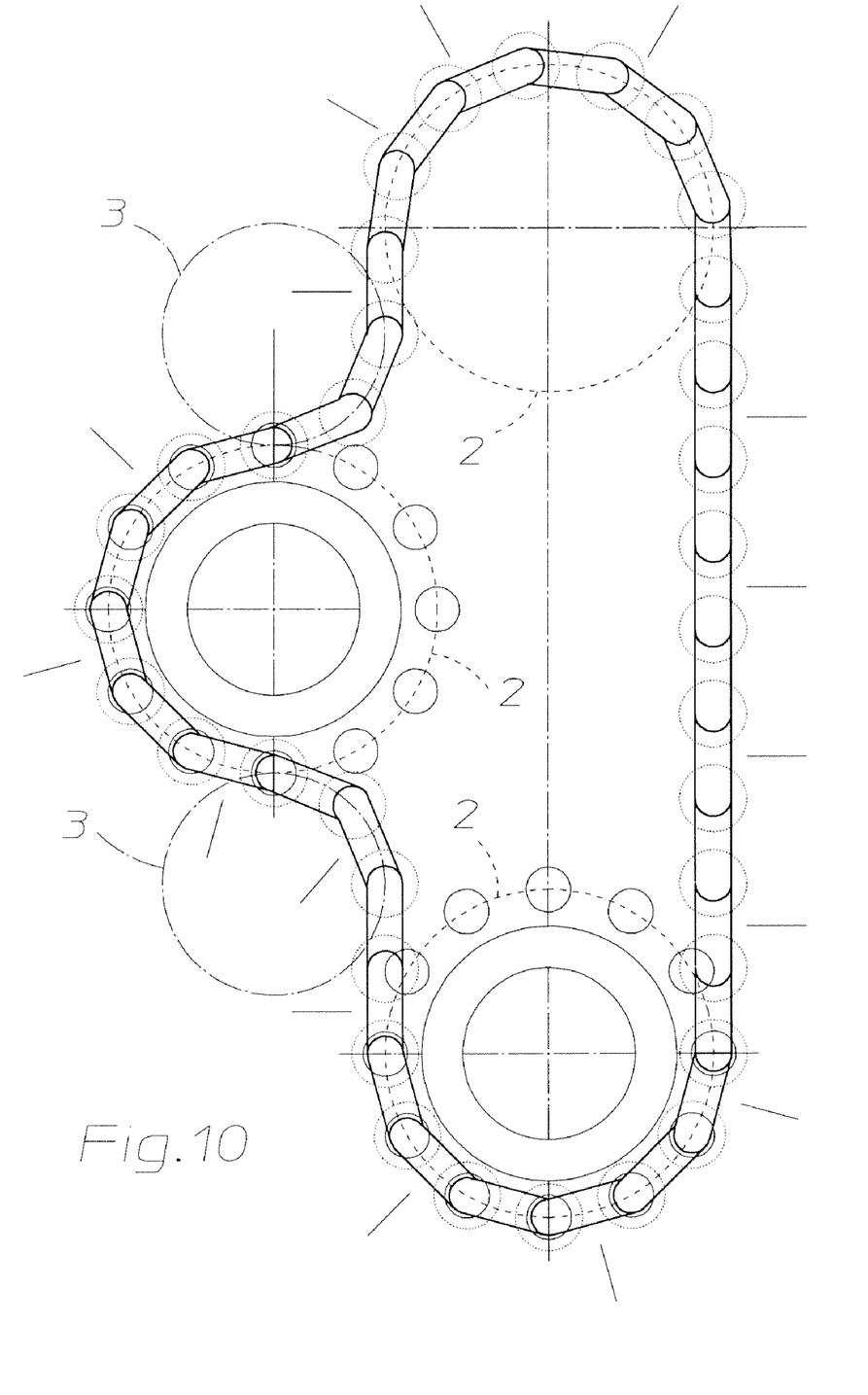

FIG. 10 shows another example of a more complex installation consisting of three carousels 2 and two return wheels 3.

The invention claimed is:

1. Installation for uncapping glass or crystal pieces, comprising
   at least one drive wheel and at least one return wheel,
   a support element driven in circulation by the said at least one drive wheel so as to pass around the said at least one return wheel and the said at least one drive wheel,
   main chucks in a predetermined number that are supported by the support element and that, in the active position, each hold a glass or crystal piece by a first end thereof, and
   work stations situated along the support element in circulation, which perform the uncapping operations on the said glass or crystal pieces,
   at least one wheel among the said at least one drive wheel and the said at least one return wheel being a carousel that comprises secondary chucks fewer in number than the predetermined number of main chucks and that cooperates, in a cooperation zone, with the moving support element, each secondary chuck being, in this cooperation zone arranged in opposition to a main chuck on a common axis (23) and, in the active position holding a glass or crystal piece (21) by a second end thereof, opposite to the first, the main chucks being mounted on the support element and the secondary chucks on each carousel so as to allow, in the said cooperation zone, a relative movement between the opposite chucks along their common axis, between a distant position and a close position and vice versa, also in their active position, the main chucks and the secondary chucks arranged in opposition being mounted so as to be driven in rotation synchronously about their common axis in their active position.

2. Installation according to claim 1, wherein the support element is an endless transporter chain and each carousel comprises cooperation means in which the transporter chain meshes in the said cooperation zone.

3. Installation according to claim 1, wherein the work stations comprise at least one cutting station allowing decapping of the glass or crystal piece.

4. Installation according to claim 3, wherein the cutting station comprises a laser-beam device.

5. Installation according to claim 3, further comprising, upstream of the cutting station, at least one station for preheating the pieces to be cut and, downstream of the cutting station, at least one cut-edge polishing station.

6. Installation according to claim 3, further comprising at least one quality control station, at least one station for marking or decorating the machined piece, at least one welding station and/or a hot-deformation stretching station.

7. Installation according to claim 1, further comprising a single carousel, formed by a drive wheel, and a single return wheel.

* * * * *